United States Patent [19]

Steinbach

[11] 4,317,489

[45] Mar. 2, 1982

[54] GROUND-WORKING IMPLEMENT AND LIFT LINKAGE THEREFOR

[75] Inventor: James G. Steinbach, Davenport, Iowa

[73] Assignee: Deere & Company, Moline, Ill.

[21] Appl. No.: 161,522

[22] Filed: Jun. 20, 1980

Related U.S. Application Data

[63] Continuation of Ser. No. 964,243, Nov. 27, 1978, abandoned.

[51] Int. Cl.³ ............................................. A01B 63/22
[52] U.S. Cl. .................................... 172/400; 172/413; 172/421; 280/43.13; 280/43.23
[58] Field of Search ............... 172/311, 314, 400, 401, 172/405, 413, 414, 415, 416, 418, 421, 423; 280/43.13, 43.16, 43.23, 414.5

[56] References Cited

U.S. PATENT DOCUMENTS

| | | | |
|---|---|---|---|
| 2,519,002 | 8/1950 | Stemen et al. | 280/43.16 |
| 2,588,709 | 3/1952 | Elliott | 172/416 X |
| 2,833,587 | 5/1958 | Saunders | 280/42.23 X |
| 3,090,449 | 5/1963 | Ward | 172/400 X |
| 3,209,839 | 10/1965 | Morkoski et al. | 172/405 |
| 3,578,352 | 5/1971 | Heine | 280/43.23 |
| 3,627,157 | 12/1971 | Blatchly | 280/43.13 X |
| 3,941,194 | 3/1976 | Orthman | 172/311 |
| 4,026,365 | 5/1977 | Andersson et al. | 172/413 X |
| 4,113,024 | 9/1978 | van der Lely et al. | 172/413 X |
| 4,126,332 | 11/1978 | Johansson | 280/43.16 X |

FOREIGN PATENT DOCUMENTS 498921  4/1976  U.S.S.R. ................. 172/413

*Primary Examiner*—Richard T. Stouffer

[57] ABSTRACT

A drawn moldboard plow includes a lift linkage for the rear furrow and ground wheels which improves ground penetration by causing the plow frame to roll as it is lowered so the share points contact the soil first. A hydraulic cylinder contained within a part of the frame operates both the furrow and the ground wheels through a linkage which, during retraction, raises the ground wheel at a faster rate than the rear furrow wheel so the plow frame rolls in the direction of the ground wheel. If the ground wheel reaches its plowing position determined by an adjustable stop before the furrow wheel, a lost motion connection allows continued retraction of the cylinder to further raise the furrow wheel to its plowing position.

33 Claims, 6 Drawing Figures

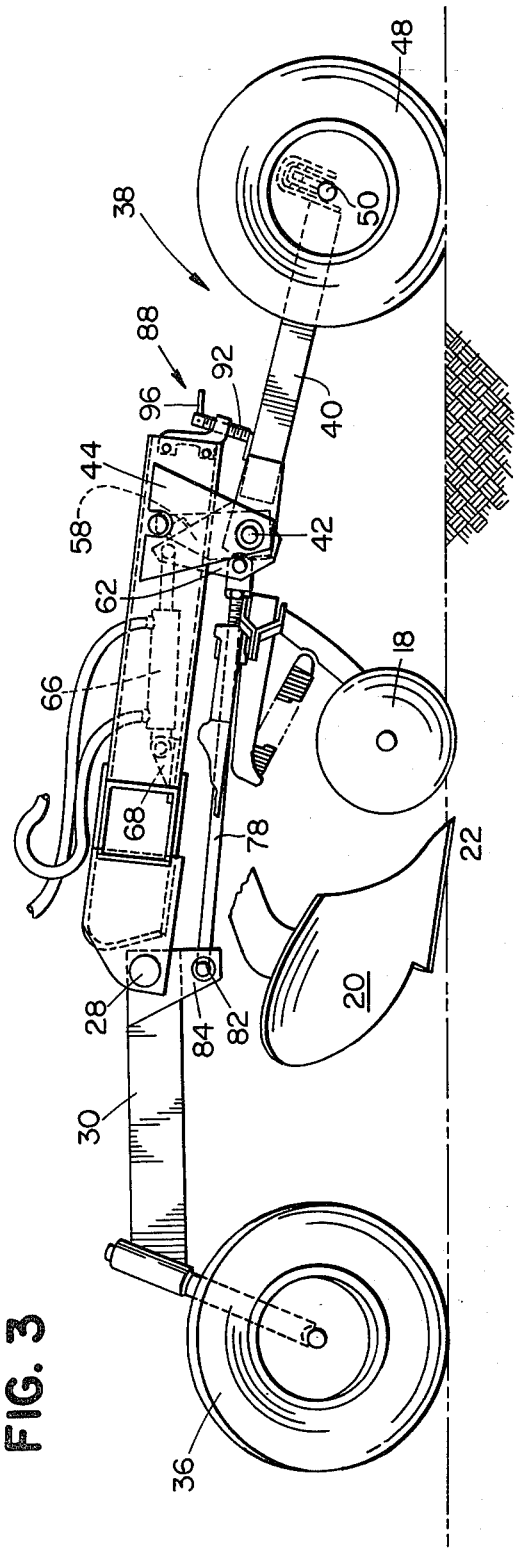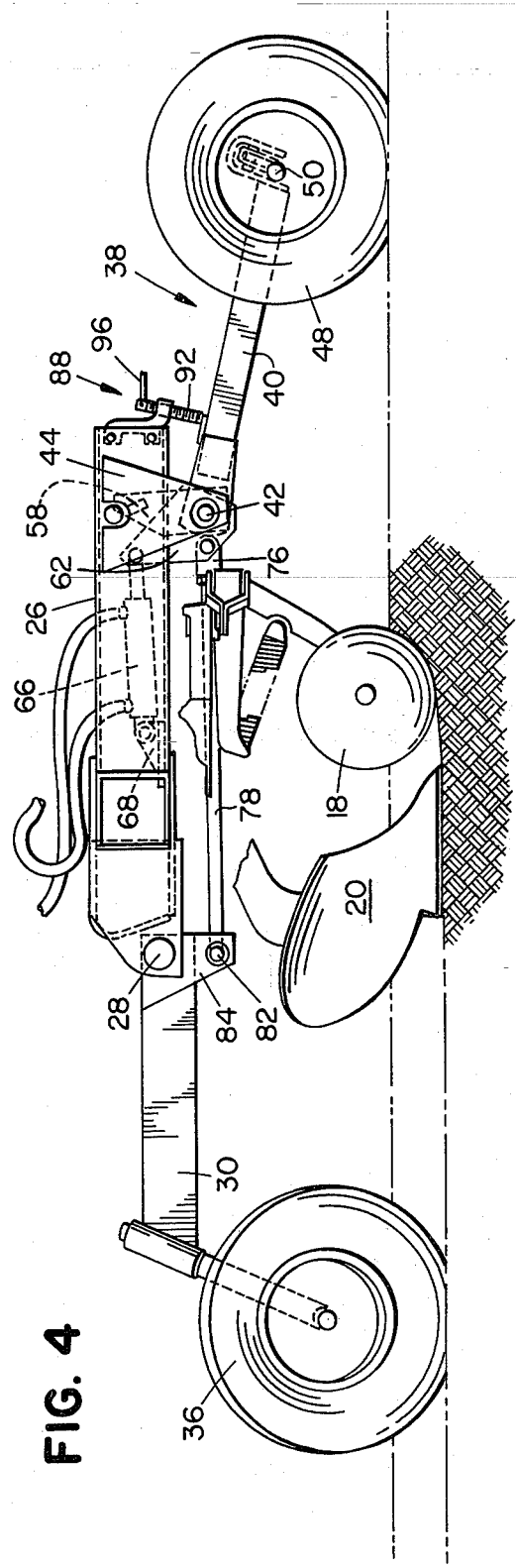

GROUND-WORKING IMPLEMENT AND LIFT LINKAGE THEREFOR

CROSS REFERENCE TO RELATED APPLICATION

This is a continuation of U.S. application Ser. No. 964,243, filed 27 Nov. 1978, now abandoned.

BACKGROUND OF THE INVENTION

The present invention relates generally to plows and more specifically to a lift linkage for a plow.

The typical drawn or towed plow is supported on front and rear furrow wheels and on a land wheel located forwardly of the rear furrow wheel. The plowing depth is conventionally controlled by adjusting the land wheel and the front furrow wheel. Such a plow is shown, for example, in U.S. Pat. No. 3,731,749.

Typical of previous plows, a hydraulic cylinder is directly connected to the ground wheel. The furrow wheel is vertically adjusted by the cylinder through a linkage which includes a lost motion connection. A cylinder having an adjustable stop for setting the plowing depth is commonly required and is more expensive than conventional cylinders.

Often in the case of conventional drawn plows, when the wheels are raised so that the plow enters the ground, the frame lowers in the approximate plowing attitude. Better and faster ground penetration can be achieved by slightly rolling or tilting the plow frame towards the landwheel so the point of each of the plow shares angles downwardly and enters the ground before the remainder of the share contacts and penetrates the soil. Although numerous lift linkage and hydraulic systems have been devised to adjust the rear furrow wheel with respect to the ground wheel, none have heretofore provided a satisfactory mechanism for tilting the plow frame while it is being lowered so that ground penetration is enhanced.

SUMMARY OF THE INVENTION

It is, therefore, a principal object of the invention to provide a lift linkage for raising and lowering the ground wheel and furrow wheel of a plow and for causing the plow frame to roll or tilt so the points of the plow shares enter the ground first as the plow is lowered.

Another object of the invention is to provide rear lift linkage for raising and lowering the plow for tilting the plow as it is lowered. The linkage is operated by a conventional hydraulic cylinder which is connected for directly controlling the rear furrow wheel.

It is a further object of the invention to provide a lift linkage including a fore-and-aft hollow wheel frame for mounting the rear furrow and ground wheels wherein the means for raising and lowering the frame is at least partially contained within the frame itself.

It is yet another object of the invention to provide a plow having a frame supported on a furrow wheel and a ground wheel, with a hydraulic cylinder connected through linkages to the wheels to raise the ground wheel at a faster rate than the furrow wheel so the frame rolls or tilts towards the ground wheel as the plow is lowered into the ground. An adjustable depth stop limits the movement of the ground wheel so that it supports the plow for the desired plowing depth. If the stop is adjusted for less than the maximum plowing depth, a lost motion connection between the cylinder and the ground wheel allows the furrow wheel to continue to be raised to the desired height so that the plow assumes its conventional plowing attitude after initial entry into the ground.

Other objects and advantages of the invention will become clear from the following detailed description when taken in conjunction with the accompanying drawings.

BRIEF DESCRIPTION OF THE DRAWINGS

In the drawings:

FIG. 3 is a view similar to FIG. 2 but showing the plow as it is entering the ground;

FIG. 4 is a view similar to that of FIG. 2, but with the wheels raised and the plow in the ground working position;

DESCRIPTION OF THE PREFERRED EMBODIMENT

Figure 1:
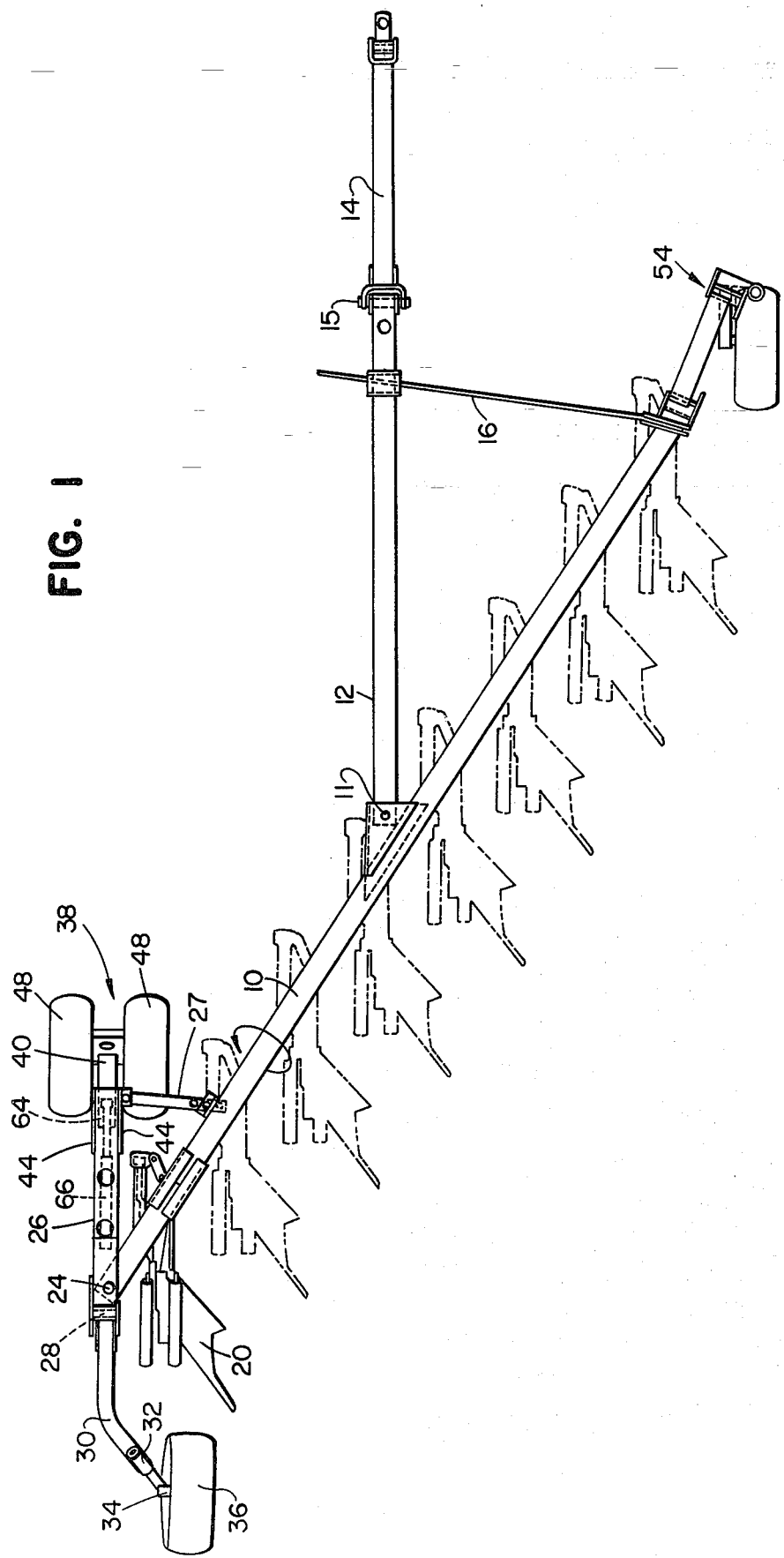
FIG. 1 is a top view of a plow constructed in accordance with the present invention.

Referring to the drawings, the plow according to the present invention includes a frame assembly having a main frame 10 extending obliquely to the direction of movement of the plow. Pivotally connected to the frame 10 by a pin 11 is a hitch tube 12. A drawbar 14 that forms part of the hitch is pivotally connected to the hitch tube 12 by a generally horizontal pin 15. The forward part of the hitch tube is laterally supported by a bar 16 extending between the frame 10 and the tube 12. The frame mounts a plurality of coulters 18 and a plurality of conventional plow bottoms 20, each with a share having a leading edge or point 22. Alternatively, the frame could carry similar earthworking tools having leading edges or points for penetrating the ground as the frame is lowered.

A pin 24 connects a generally horizontal fore-and-aft hollow beam or wheel frame 26 to the rear of the main frame 10 to rock with the latter about it axis. A bar 27 secures the forward end of the beam 26 with respect to the frame 10.

Connected for rocking about a generally horizontal pivot or pin 28 is a furrow wheel arm 30 which carries a bearing 32. A shaft 34 mounted in the bearing 32 carries a conventional rear furrow wheel 36. As best seen in FIG. 1, the arm 30 is angled inwardly so that the wheel 36 trails the rear plow bottom 20.

A land wheel assembly 38 includes an arm 40 rockably connected to the beam 26 by a generally horizontal pivot 42 which in turn is connected between brackets 44 welded or otherwise secured on either side of and near the forward end of the beam 26. A pair of ground or gauge wheels 48 are carried by an axle 50 supported for limited pivoting about an axis 52 on the end of the arm 40.

Connected towards the front of the frame 10 is a conventional front furrow wheel assembly 54. A hydraulic cylinder raises and lowers the forward end of the frame with respect to the furrow wheel.

Figure 6:
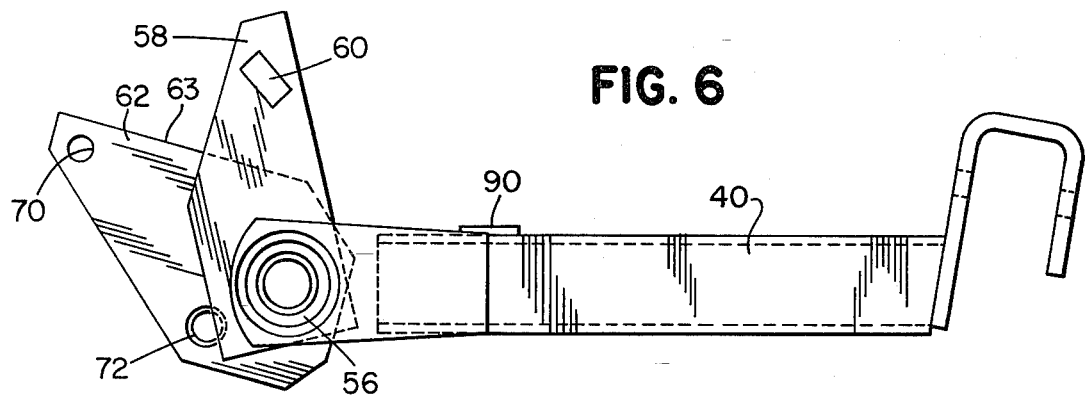
FIG. 6 is a side view of the linkage shown in FIG. 5.

The land wheel arm 40 is welded or otherwise secured to a bushing or sleeve assembly 56 mounted for rocking about the pivot 42. Also secured to the bushing assembly 56 in parallel spaced apart relation are a pair of plates 58. A contact bar 60 extends between and is welded to the plates. The bushing assembly 56, plates 58, bar 60 and land wheel arm 40 form a single rigid arm member. A control arm or reciprocating plate member 62 is connected for freely rocking about the bushing assembly 56 between the plates 58 and includes a contact face 63 which abuts against the contact bar 60 as plate 62 is rotated in the clockwise direction from the position shown in FIG. 6.

An opening 64 is provided in the bottom wall of the beam 26, and the plates 58 and 62 extend upwardly through the opening. A double-acting hydraulic cylinder 66 is anchored within the beam 26 by a bracket 68. A pin passes through the bifurcated end of the cylinder rod and through a hole 70 near the upper end of the arm 62 to operably connect the cylinder with the arm. Pinned to the arm 62 through a hole 72 located radially inwardly from the hole 70 is one end of a rod assembly 74 including a clevis 76 internally threaded for receiving the threaded end of a rod 78. A portion of the pin and clevis 76 and the arm 62 are centrally confined with respect to the bushing assembly 56 (FIG. 5) by the plates 58 which also prevent the pin from slipping out of the clevis and hole 72. A jam nut 80 threaded over the rod 78 is tightened against the clevis 76 to secure the rod against rotation. The opposite end of the rod assembly 74 extends through and is held by a rear lock nut within a pin or trunnion 82 pivotally connected to a rock arm 84 which is preferably in the form of parallel plates welded on either side of the furrow wheel arm 30 for rocking therewith about the pivot 28.

Figure 5:
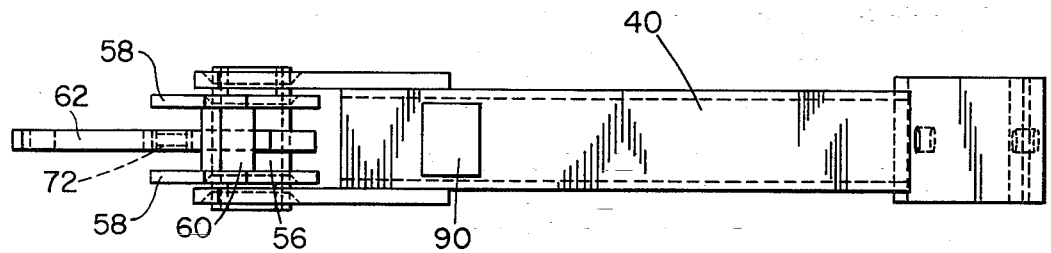
FIG. 5 is a top view of a part of the linkage including the ground wheel arm and the control arm.

When the cylinder 66 is extended, the control arm 62 is pivoted against the forward face of the bar 60 and rocks the plates 58 and the arm 40 in the clockwise direction, lowering the ground wheels 48 until the cylinder is fully extended. Movement of the control arm 62 in the clockwise direction also shifts the rod assembly 74 forwardly, pivoting the rock arm 84 and the furrow wheel arm 30 in the counterclockwise direction to lower the furrow wheel 36, lifting the beam 26 and the frame 10. The linkage moment arm lengths are designed to rotate the arm 40 about the pivot 42 at a greater rate than the furrow wheel arm 30 is rotated about the pivot 28. The land wheels 48, therefore, are raised and lowered at a greater rate than the rear furrow wheel 36. As best seen in FIGS. 1 and 5, the moving elements of the lift linkage including the arm 40, the plates 58, arm 62, the rod assembly 74, the rock arm 84, and the cylinder 66 are located directly in line with each other to eliminate bending moments.

Retracting the hydraulic cylinder 66 rotates the control arm 62 in counterclockwise direction and the weight of the plow on the land wheel assembly 38 biases the arm 40 and the plates 58 in the counterclockwise direction so that the bar 60 remains abutted against the contact portion 63 until the ground wheels 48 reach the plowing position. As the control arm 62 moves in the counterclockwise direction, it shifts the rod assembly 74 rearwardly allowing the rock arm 84 and the furrow wheel arm 30 to pivot in the clockwise direction to permit the furrow wheel 36 to raise but at a slower rate than the ground wheels 48 are raised because of the linkage arm lengths. Since the ground wheels 48 are raised more quickly than the furrow wheel 36, the front of the beam 26 tilts downwardly below the rear of the beam causing the main frame 10 to roll or tilt in the clockwise direction toward the ground wheels 48 as shown by the arrow in FIG. 1. The plow shares 20 roll with the frame so the share points 22 are tilted downwardly (FIG. 3) to contact and enter the ground before a larger portion of the plow shares contact the soil. The pivotal connection between the hitch tube 12 and the drawbar 14 allows the forward end of the tube to drop as the frame 10 rolls in the direction of the arrow.

An adjustable depth stop 88 is secured to the frame for contacting a plate 90 on the arm 40 to limit the counterclockwise movement of the arm for adjusting the plowing depth. The stop 88 preferably includes a stud 92 threaded through a hole in a support 94 bolted to the forward end of beam 26. A bent pin 96 is provided for turning the stud 92 to the adjusted position. When the plate 90 on the arm 40 contacts the stop 88 (FIG. 3), the arm and the plates 58 stop rocking about the pivot 42. With all depth stop settings except the maximum, the arm 40 contacts the stop 88 before the rear furrow wheel 36 has reached its operating or plowing position. Continued retraction of the cylinder 66 causes the control arm 62, since it is free to pivot about the sleeve 56, to rotate in the counterclockwise direction away from the bar 60. The rod assembly 74 moves rearwardly and the furrow wheel 36 rises to the final plowing position (FIG. 4). Simultaneously, the beam 26 returns to a generally horizontal attitude as the furrow wheel 36 enters the furrow, and the frame 10 rolls back to its normal plowing position so the share points 22 are no longer tilted downwardly. The depth of the furrow wheel can be adjusted by loosening the jam nut 80 on the rod assembly 74 and turning the threaded rod 78 to extend or retract the rod with respect to the internally threaded clevis 76.

Figure 2:
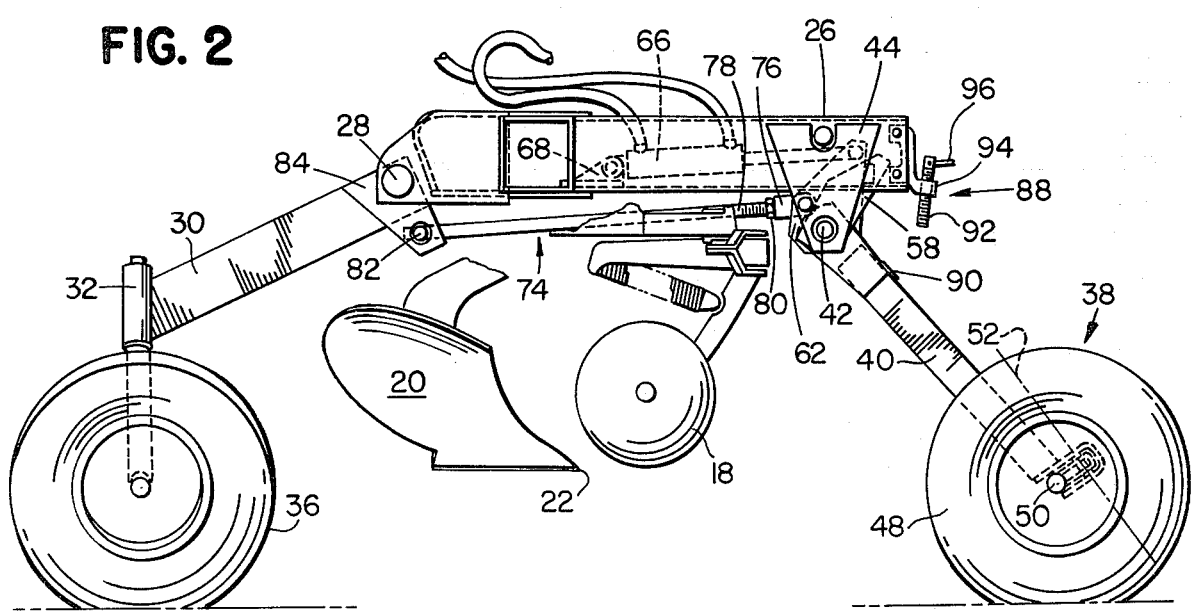
FIG. 2 is a side view of the rear of the plow in FIG. 1 with the ground and furrow wheels lowered so the plow is in the raised position.

To lift the plow from the ground working position, fluid under pressure is supplied to the cylinder 66 extending the cylinder rod and rotating the control arm 62 in the clockwise direction about the pivot 42. The rod assembly 74 is moved forwardly by the control arm 62, rotating the furrow wheel arm 30 in the counterclockwise direction to raise the rear end of the plow. As the control arm 62 contacts the bar 60, the plates 58 begin to rotate with the control arm about the pivot 42 thus lowering the arm 40 and the ground wheels 48 with the furrow wheel 36 to aid in lifting the plow to the raised position. The cylinder 66 can be fully extended at which time both the furrow wheel 36 and the ground wheels 48 are in the final transport position (FIG. 2).

To lower the plow into the ground, the front furrow wheel 54 is raised so the forward plow bottoms 20 begin to penetrate the soil as the plow moves forwardly. The hydraulic cylinder 66 is retracted, rotating the control arm 62 and allowing the arm 40 and ground wheels 48 to raise with respect to the frame under the weight of the plow. Simultaneously the arms 84 and 30 are allowed to rock as the rod assembly 74 moves rearwardly, and the furrow wheel 36 rises but at a slower rate than the ground wheels 48 to tilt the beam 26 towards the ground wheels. The main frame 10 rolls slightly about its longitudinal axis to angle the share points 22 towards the ground. The stop 88 prevents further rotation of the arm 40 and the plates 58 when the wheels 48 have reached the preselected plowing position. If the depth stop 88 is set for plowing at less than the maximum depth (FIG. 4), the furrow wheel 36 continues to raise as the control arm 62 pivots away from the bar 60 between the arm 58 until the cylinder 66 is completely retracted. If the depth stop 88 is adjusted for maximum plowing depth, both the ground and the rear furrow wheels reach their plowing positions at approximately the same time. However, it should be noted that regardless of the depth setting, the ground wheels raise more quickly than the rear furrow wheel. The plates 58, the bar 60 and the freely pivoting control arm 62 on the bushing assembly 56 provide a lost motion connection, and the choice of linkage arm lengths allows the ground wheels 48 to raise faster than the furrow wheel 36 to cause the plow frame 10 to roll or tilt with the beam 26 so the plow share points are angled toward the ground. Better and quicker ground penetration is achieved by tilting the frame rather than lowering it in the approximate plowing attitude. The lost motion connection and the adjustable depth stop 88 allow the ground wheels 48 to be set for the desired plowing depth without affecting the operation of rear furrow wheel and without requiring a cylinder with an adjustable stop. The cylinder is fully extended during transporting and fully retracted during plowing.

The placement of the cylinder 66 and part of the wheel arm and control arm assemblies within the beam 26 reduces the number of exposed moving parts as well as enhances the appearance of the unit. The moving parts of the assemblies are placed directly in line to eliminate bending moments and minimize wear.

I claim:

1. In a plow having a plow frame with a pluraltiy of plow bottoms, a wheel assembly comprising:
    a forward land arm;
    a rear furrow arm;
    power means mounted on the frame and connected to the land and furrow arms for raising and lowering the plow frame between a lower position in which the plow bottoms are in a groundworking condition and an upper position in which the plow bottoms are out of engagement with the ground, and adapted to tilt the frame as the frame moves from the upper to the lower position so as to tilt the plow bottoms downwardly for better entry into the ground; and
    stop means separate from the power means and connected between the frame and the land arm for adjusting the lower position.

2. The invention defined in claim 1 wherein the power means comprises a reciprocating member operably connected to the furrow arm and forming a lost motion connection with the land arm.

3. The invention defined in claims 1 or 2 further comprising stop means connected between the frame and the land arm for adjusting the lower position.

4. In a ground-working implement having a main frame and a plurality of ground-working tools with points depending from the frame, a lift mechanism for raising and lowering the frame between a transport and an operating position and for tilting the frame to change the angle at which the points contact the ground upon lowering the frame comprising:
    forward and rearward ground-engaging wheel assemblies connected to and for vertical movement with respect to the frame, the assemblies located on opposite fore-and-aft sides of the frame;
    activating means for raising and lowering the rear wheel assembly between the transport and the operating position;
    means responsive to the raising of the rear wheel assembly for raising the forward wheel assembly to the operating position during, but at a faster rate than, the raising of rear wheel assembly to roll the frame towards the forward wheel assembly.

5. In a plow having a frame, a plurality of plow bottoms each having a plow share with a leading point secured to the frame, and a frame support including a rear furrow wheel mounted at the rear of the frame for riding in the furrow and for vertical movement with respect to the frame and a ground wheel mounted on the frame forwardly of the furrow wheel for riding on the ground adjacent to the furrow and for vertical movement with respect to the frame, a lift linkage for moving the furrow and ground wheels vertically between plowing and transport positions comprising:
    an extensible and retractable activating means connected to the frame;
    first means connecting the activating means and the rear furrow wheel for moving the latter towards the transport or the plowing position as the activating means is extended or retracted, respectively; and
    second means responsive to the activating means for moving the ground wheel towards the transport or the plowing position as the activating means is extended or retracted, respectively, the second means adapted to vertically move the ground wheel at a faster rate than the first means vertically moves the furrow wheel so that upon movement of the wheels towards their plowing positions the plow frame will roll in the direction of the ground wheel to angle the share points downwardly.

6. The invention defined in claim 5 further including depth adjustment means for stopping the vertical movement of the ground wheel in the plowing position and wherein a lost motion connection is provided between the first and second means for operating the second means from the first to move the ground wheel to the plowing position as the furrow wheel is moved towards the plowing position and for permitting further movement of the furrow wheel to its plowing position after the ground wheel has stopped in its plowing position.

7. The invention defined in claim 5 wherein the first means includes means for adjusting the plowing position of the furrow wheel.

8. The invention defined in claim 5 wherein the fore-and-aft beam includes a tubular portion and wherein the activator is mounted within the tubular portion.

9. In a plow having a frame, a plurality of plow bottoms secured to and depending from the frame and wheel means including a rear furrow wheel and a ground wheel supporting the frame; lift means connected between the frame and the wheel means for raising and lowering the frame on the wheel means between raised transport and lowered plowing positions; activating means connected between the frame and the lift means to raise and lower the frame; the lift means comprising first and second arm means rockably mounted on the frame and carrying the rear furrow wheel and the ground wheel, respectively, means operably connecting the activating means and first arm member for raising and lowering the rear furrow wheel, lost motion connection means located between the second arm means and the activating means and responsive to the operation of the activating means to raise and lower the ground wheel with, but at a faster rate than, the furrow wheel so the frame rolls toward the ground wheel, and adjustable depth setting means for stopping the vertical movement of the ground wheel to set the plowing depth upon lowering the frame, the lost motion connection means permitting continued operation of the activating means after the ground wheel has stopped at the plowing depth setting.

10. The invention defined in claim 9 wherein the connecting means comprises a control member rockable by the activating means.

11. The invention defined in claim 10 wherein the lost motion connection means comprises contact means connected for rocking with second arm member, the contact means biased into engagement with and rockable with the control member while the ground wheel is below its plowing position but separable from the contact means upon the ground wheel reaching its plowing position.

12. In a plow having a frame extending obliquely to the direction of travel, a plurality of plow bottoms secured to the frame, a lift assembly for raising and lowering the frame between plowing and transport positions comprising:
   forward and rearward arm members each mounted on opposite fore-and-aft sides of and near the rear of the frame for rocking in a substantially vertical plane;
   a furrow wheel mounted on the rearward arm member;
   a gauge wheel mounted on the forward arm member;
   activating means mounted on the frame
   and operably connected to the rearward arm member for rocking the arm member to raise and lower the frame on the furrow wheel;
   means responsive to the operation of the activating means for rocking the forward arm member to raise and lower the frame on the gauge wheel and for raising the gauge wheel at a faster rate than the furrow wheel while lowering the frame to the plowing position so the frame tilts to change the angle of the plow bottoms with respect to ground.

13. The invention defined in claim 12 wherein the activating means comprises an extensible and retractable hydraulic cylinder.

14. The invention defined in claim 12 further including adjustable stop means for limiting the vertical movement of the gauge wheel to set the plowing depth.

15. The invention defined in claim 14 wherein the means responsive to the activating means includes a lost motion connection between the forward and rearward arm members for permitting further raising of the furrow wheel after the gauge wheel has reached the plowing position.

16. In a plow including a diagonally extending elongated plow frame carrying a plurality of plow bottoms with downwardly extending bottom edges, a rear wheel assembly comprising:
   a fore-and-aft extending wheel frame connected to the plow frame near the rear extremity thereof for rocking therewith about its longitudinal axis;
   a furrow arm mounted for relative vertical movement between a transport and a working position on the rear of the wheel frame and carrying a furrow wheel;
   a land arm mounted for relative vertical movement between a transport and a working position on the front of the wheel frame and carryng a land wheel wherein a portion of the wheels extend below the bottom edges of the plow bottoms when the arms are in the transport position;
   a reciprocating member mounted on the frame;
   means connecting the reciprocating member to the furrow arm and the land arm to raise and lower the rear of and the front of the wheel frame on the furrow and land wheels and including a lost motion connection for lowering the front and rear of the wheel frame at a differential rate to thereby rotate the plow frame about its longitudinal axis.

17. In a plow having a main frame carrying a plurality of plow bottoms, a wheel assembly comprising:
   a fore-and-aft extending wheel frame connected to the rear portion of the main frame;
   a furrow arm mounted for relative vertical movement on the rear of the wheel frame and carrying a furrow wheel;
   a land arm mounted for relative vertical movement on the front of the wheel frame and carrying a land wheel;
   engageable stop means located between the wheel frame and the land arm for limiting downward movement of the front of the wheel frame to a preselected position corresponding to the working depth of the plow bottoms;
   a reciprocating member mounted on the frame;
   means connecting the reciprocating member to the furrow arm and the land arm to raise and lower the front end of the wheel frame to engagement and disengagement of the stop means with the furrow arm and to raise and lower the rear end of the wheel frame between transport and working depth of the plow bottom positions for both, the stroke of the reciprocating member being of such length that the front and rear ends of the wheel frame will lower in unison until the stop means limits downward movement of the front end of the wheel frame and will continue to lower the rear end of the wheel frame until the rear end of the wheel frame is in the desired position for the working depth of the plow bottoms.

18. In a plow having a plow bottom carrying main plow frame extending diagonally with respect to the fore-and-aft direction and a hitch structure extending forwardly from the main frame and connectible at its forward end to a tractor, a wheel assembly comprising:
   a fore-and-aft extending rear wheel frame connected to the rear end portion of the main frame to rock with the latter about its axis;
   a furrow wheel arm pivotally mounted for relative vertical movement on the rear end of the wheel frame and carrying a furrow wheel thereon in substantial trailing relation to the rearmost plow bottom on said main frame; a land wheel arm pivotally mounted for relative vertical movement on the wheel frame and carrying a land wheel thereon forward of the rear portion of the main frame;
   an adjustable stop means between the wheel frame and the land wheel arm for limiting downward movement of the forward portion of the wheel frame relative to the ground, said stop means separable therefrom upon the forward end of the wheel frame being raised on the land wheel arm;
   a member mounted on the wheel frame for reciprocal motion and engageable with the land wheel arm during a portion of its reciprocal stroke to cause the arm to separate from its stop means and thereby raise the forward end of the wheel frame;
   power means on the wheel frame and connected to the member for effecting the reciprocal stroke of said member; and means connecting the furrow wheel arm to said reciprocal member and effective to raise and lower the rear portion of said wheel frame throughout opposite phases respectively of the reciprocal stroke.

19. The invention defined in claim 18 wherein the wheel frame includes a hollow portion and the power means is located within said portion.

20. In a plow having an elongated plow frame extending diagonally with respect to the forward direction of travel, the frame carrying a plurality of downwardly extending earthworking tools, a wheel assembly comprising:
a fore-and-aft member connected to the plow frame and including a hollow beam portion;
a forward and a rearward wheel arm each mounting a ground-engaging wheel and rockably connected for vertical movement with respect to the frame at the fore and aft ends respectively of the member to raise and lower the frame between a working and a transport position, wherein in the transport position a portion of the wheels extend below the lower extremities of the earthworking tools to support the frame above the ground;
reciprocating means at least partially contained within the hollow beam portion for rocking the forward and rearward arms,
the reciprocating means including means for rocking the forward and the rearward wheel arm at a differential rate to roll the frame about its axis.

21. The invention defined in claim 20 wherein the forward wheel arm and the reciprocating means aligned in the fore-and-aft direction so that bending moments are reduced.

22. The invention defined in claim 1 wherein one of the wheel arms is connected near its upper end to the rigid member for rocking around a transverse horizontal pivot and includes a lever member extending upwardly through an aperture in the rigid member for engagement with the power means.

23. In a plow having a frame, a plurality of plow bottoms each having a plow share with a leading point secured to the frame, and a frame support including a rear furrow wheel mounted at the rear of the frame for riding in the furrow and for vertical movement with respect to the frame and a ground wheel mounted on the frame forwardly of the furrow wheel for riding on the ground adjacent to the furrow and for vertical movement with respect to the frame, a lift linkage for moving the furrow and ground wheels vertically between plowing and transport positions comprising:
an extensible and retractable activating means connected to the frame;
first means connecting the activating means and the rear furrow wheel for moving the latter towards the transport or the plowing position as the activating means is extended or retracted, respectively;
second means responsive to the activating means for moving the ground wheel towards the transport or the plowing position as the activating means is extended or retracted, respectively, the second means adapted to vertically move the ground wheel at a faster rate than the first means vertically moves the furrow wheel so that upon movement of the wheels towards their plowing positions the plow frame will roll in the direction of the ground wheel to angle the share points downwardly;
depth adjustment means for stopping the vertical movement of the ground wheel in the plowing position; and
wherein a lost motion connection is provided between the first and second means for operating the second means from the first means to move the ground wheel to the plowing position as the furrow wheel is moved towards the plowing position and for permitting further movement of the furrow wheel to its plowing position after the ground wheel has stopped in its plowing position.

24. In a plow having a frame, a plurality of plow bottoms each having a plow share with a leading point secured to the frame, and a frame support including a rear furrow wheel mounted at the rear of the frame for riding in the furrow and for vertical movement with respect to the frame and a ground wheel mounted on the frame forwardly of the furrow wheel for riding on the ground adjacent to the furrow and for vertical movement with respect to the frame, a lift linkage for moving the furrow and ground wheels vertically between plowing and transport positions comprising:
an extensible and retractable activating means connected to the frame;
first means connecting the activating means and the rear furrow wheel for moving the latter towards the transport or the plowing position as the activating means is extended or retracted, respectively;
second means responsive to the activating means for moving the ground wheel towards the transport or the plowing position as the activating means is extended or retracted, respectively, the second means adapted to vertically move the ground wheel at a faster rate than the first means vertically moves the furrow wheel so that upon movement of the wheels towards their plowing positions the plow frame will roll in the direction of the ground wheel to angle the share points downwardly; and
wherein the first means includes means for adjusting the plowing position of the furrow wheel.

25. In a plow having a frame, a plurality of plow bottoms secured to the frame, a lift assembly for raising and lowering the frame between plowing and transport positions comprising:
forward and rearward arm members each mounted on the frame for rocking in a substantially vertical plane;
a furrow wheel mounted on the rearward arm member;
a gauge wheel mounted on the forward arm member;
activating means mounted on the frame;
first means operably connecting the rearward arm member with the activating means for rocking the arm member to raise and lower the frame on the furrow wheel;
second means connected to the forward arm member and responsive to the operation of the first means for rocking the arm member to raise and lower the frame on the gauge wheel, the first and second means raising the wheels at a differential rate while lowering the frame to the plowing position so the frame tilts to change the angle of the plow bottoms with respect to ground; and
adjustable stop means for limiting the vertical movement of the gauge wheel to set the plowing depth, said stop means being separate from said activating means.

26. The invention defined in claim 25 wherein the first and second means form a lost motion connection for permitting further rocking of the rearward arm member after the gauge wheel has reached the plowing position.

27. The invention defined in claim 16 wherein the wheel frame comprises a tubular member, and wherein the reciprocating member is contained within the tubular member.

28. In an implement having an elongated frame which is adapted for movement over the ground in the forward direction and which supports a plurality of earth-working tools, said frame rockable about its longitudinal axis, said axis being oblique to the forward direction a lift assembly comprising:
 a rigid elongated member having a major axis extending generally in the fore-and-aft direction and including a hollow portion;
 means connecting the member to the elongated frame for rocking with the latter and about its longitudinal axis;
 a forward and a rearward wheel arm each mounting a ground-engaging wheel and connected for vertical movement with respect to, and near the front and rear end respectively of, the member on opposite sides of the longitudinal axis of the frame to rock the member and thereby rock the frame and to raise and lower the member between a working and transport position;
 power means substantially contained within the hollow portion and extendable and retractable in the fore-and-aft direction; and
 means operably connecting the power means and the rearward wheel arm for vertically moving the arms at a differential rate to rock and raise and lower the member as the power means is extended and retracted.

29. The invention defined in claim 28 wherein the forward wheel arm, the power means, and the means operably connecting are aligned in the fore-and-aft direction so that bending moments are reduced.

30. The invention defined in claim 20 wherein the forward wheel arm is connected near its upper end to the hollow beam portion for rocking about a horizontal pivot and includes a lever member extending upwardly through an aperture in the hollow portion for engagement with the reciprocating means.

31. In a ground-working implement having an elongated frame adapted for forward movement over the ground and having a longitudinal axis angled with respect to the forward direction, a lift assembly comprising:
 a rigid fore-and-aft extending wheel frame including a fore-and-aft extending hollow portion;
 a first arm member having upper and lower ends and pivotally connected near its upper end to the fore end of the wheel frame for rocking between generally a downwardly extending position and a forwardly extending position;
 a second arm member pivotally connected near the aft end of the wheel frame for rocking between generally a downwardly extending position and a rearwardly extending position;
 a ground-engaging wheel supported near the lower end of each arm member;
 a hydraulic cylinder mounted for fore-and-aft extension and retraction within the hollow portion of the wheel frame, wherein said cylinder when completely extended remains contained between the opposite fore-and-aft ends of the wheel frame;
 means responsive to the extension and retraction of the cylinder for rocking the first and second arm members generally at a differential rate between their respective positions to rock and to raise and lower the wheel frame; and
 means connecting the wheel frame to the elongated frame with the wheels located on opposite sides of the longitudinal axis of the elongated frame for rocking and raising and lowering the elongated frame with the wheel frame.

32. The lift assembly as set forth in claim 31 wherein the means responsive to the extension and retraction of the cylinder comprises first lever means extending from one of the arm members into the hollow portion for operably connecting said arm member to the cylinder, and means for operably connecting the other one of the arm members to the cylinder.

33. The lift arm as set forth in claim 32 wherein the means for operably connecting the other one of the arm members to the cylinder comprises second lever means supported adjacent and for contacting the first lever means, and a rod member connected between the second lever means and said other one of the arm members.

* * * * *